(12) United States Patent
Hart et al.

(10) Patent No.: US 8,873,384 B2
(45) Date of Patent: Oct. 28, 2014

(54) BANDWIDTH INDICATION IN RTS/CTS FRAMES

(75) Inventors: Brian Hart, Sunnyvale, CA (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 12/916,957

(22) Filed: Nov. 1, 2010

(65) Prior Publication Data

US 2012/0106426 A1    May 3, 2012

(51) Int. Cl.
| | |
|---|---|
| G08C 15/00 | (2006.01) |
| H04L 1/00 | (2006.01) |
| H04L 5/14 | (2006.01) |
| H04L 5/00 | (2006.01) |
| H04W 28/20 | (2009.01) |

(52) U.S. Cl.
CPC .......... *H04L 5/1438* (2013.01); *H04L 1/0054* (2013.01); *H04L 1/0061* (2013.01); *H04W 28/20* (2013.01); *H04L 5/0092* (2013.01)
USPC ............ 370/230; 370/232; 370/312; 370/338

(58) Field of Classification Search
None
See application file for complete search history.

(56) References Cited

U.S. PATENT DOCUMENTS

| | | | |
|---|---|---|---|
| 7,054,296 B1 | 5/2006 | Sorrells et al. | |
| 7,477,621 B1 | 1/2009 | Loc et al. | |
| 7,796,632 B2 | 9/2010 | Hasty et al. | |
| 2004/0179605 A1 | 9/2004 | Lane | |
| 2005/0180315 A1 | 8/2005 | Chitrapu et al. | |
| 2007/0171933 A1 | 7/2007 | Sammour et al. | |
| 2008/0253337 A1* | 10/2008 | Kim | 370/336 |
| 2009/0016714 A1* | 1/2009 | Soto et al. | 398/20 |
| 2009/0136034 A1 | 5/2009 | Gaal et al. | |
| 2010/0015970 A1* | 1/2010 | Zeng et al. | 455/422.1 |
| 2010/0146351 A1 | 6/2010 | Kakani et al. | |
| 2010/0211854 A1* | 8/2010 | Wu et al. | 714/776 |
| 2011/0069610 A1* | 3/2011 | Zelig et al. | 370/222 |

OTHER PUBLICATIONS

Merlin et al. U.S. Appl. No. 61/385,462. RTS and CTS for Multiplechannel operations, Sep. 22, 2010. pp. 1-27.*
PCT/US11/37267 International Search Report and the Written Opinion of the International Searching Authority dated Sep. 28, 2011.
Chu et al., 80MHz/160MHz Protection, Sep. 14, 2010, IEEE802.11-10/1096r6.

* cited by examiner

*Primary Examiner* — John Blanton
*Assistant Examiner* — Tito Pham
(74) *Attorney, Agent, or Firm* — Tucker Ellis LLP

(57) ABSTRACT

Disclosed in an example embodiment is an apparatus comprising a transmitter and processing logic coupled with the transmitter. The processing logic is configured to send data via the transmitter. The processing logic generates a request to send frame. The processing logic encodes data representative of a bandwidth parameter set in the request to send frame. The processing logic transmits the request to send frame via the transmitter.

12 Claims, 5 Drawing Sheets

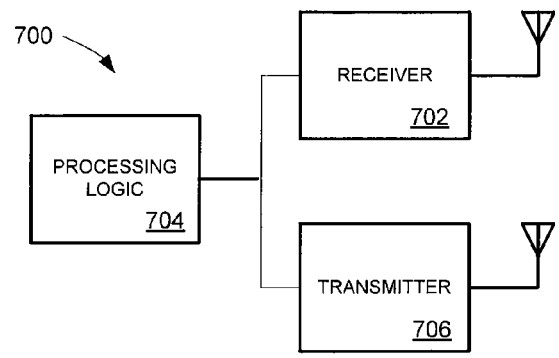
FIG. 7
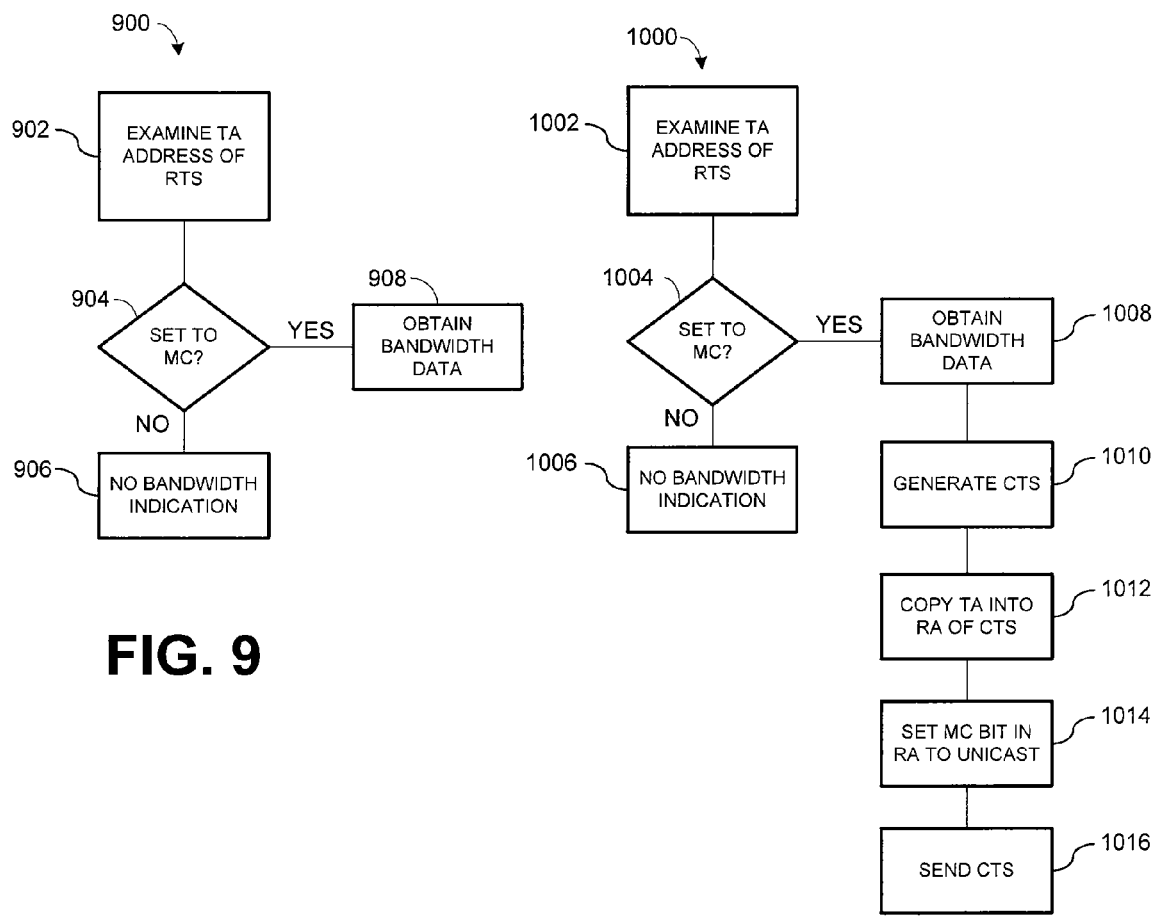
FIG. 9
FIG. 10

BANDWIDTH INDICATION IN RTS/CTS FRAMES

TECHNICAL FIELD

The present disclosure relates generally to data communications.

BACKGROUND

When sending a duplicated Request To Send (RTS) frames across 40/80/160 MHz channels, Clear To Send (CTS) frames should be returned for the same, or of some channels are busy, a reduced set of channels as the RTS. Further, to ensure that all parties hear and respect the Duration field included in the RTS and CTS frames, the frames should be backwards compatible with legacy protocols. For example, if sending RTS/CTS frame on a 5 GHz channel, a frame should be sent that is compatible with 802.11a (which may be referred to as "11a"). Moreover, using RTS and CTS frames provide the benefit of auto reset of the Network Allocation Vector (NAV). For example, if a receiver receives a RTS but does not receive a corresponding CTS or Data frame for the RTS, the receiver will reset its NAV.

Determining the bandwidth of a RTS can be performed by a digital signal processor (DSP). However, the algorithms can be complicated and prone to errors.

BRIEF DESCRIPTION OF THE DRAWINGS

The accompanying drawings incorporated herein and forming a part of the specification illustrate the example embodiments.

FIG. 7 illustrates an example of an apparatus with a receiver capable of receiving a bandwidth parameter set from a RTS frame and a transmitter which can respond with a CTS frame.

FIG. 9 illustrates an example of a methodology where a receiver determines whether a scrambler seed or scrambler field in a request to send frame contains a bandwidth parameter set.

FIG. 10 illustrates an example of a methodology where a receiver determines whether a scrambler seed or scrambler field in a request to send (RTS) frame contains a bandwidth parameter set and sends a clear to send (CTS) frame in response.

OVERVIEW OF EXAMPLE EMBODIMENTS

Figure 1:
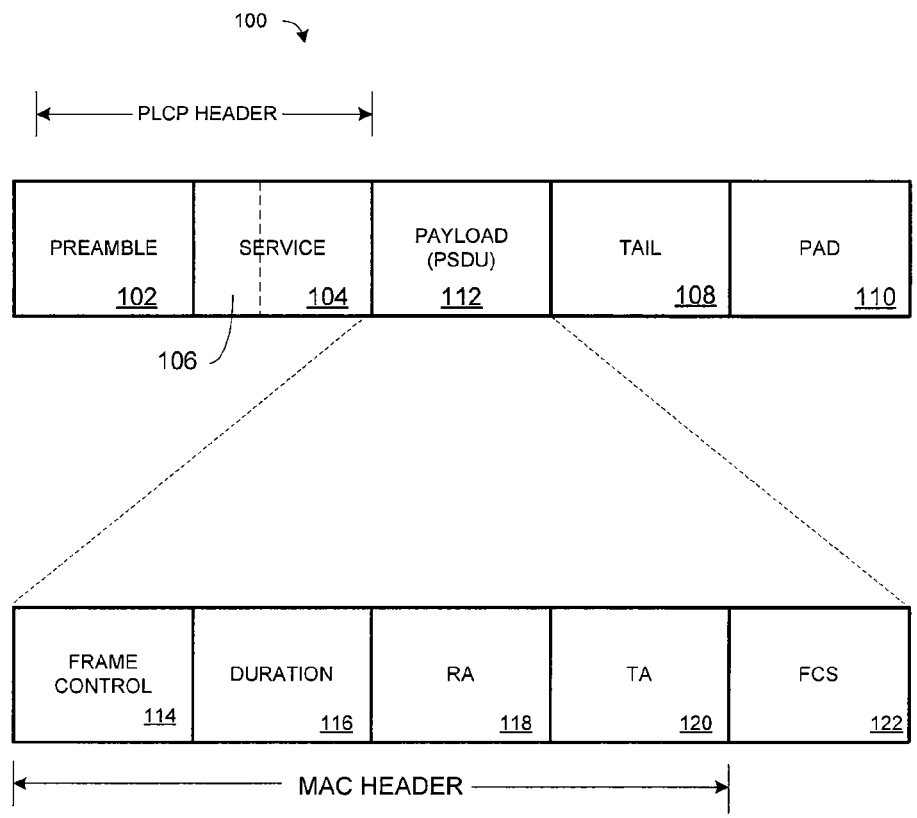
FIG. 1 is an example of a simplified packet format of a RTS frame upon which an example embodiment can be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a transmitter and processing logic coupled with the transmitter. The processing logic is configured to send data via the transmitter. The processing logic generates a request to send frame. The processing logic encodes data representative of a bandwidth parameter set in the request to send frame. The processing logic transmits the request to send frame via the transmitter.

In accordance with an example embodiment, there is disclosed herein an apparatus comprising a receiver and processing logic coupled with the transmitter, the processing logic is configured to receive data via the receiver. The processing logic receives a request to send frame via the receiver. The processing logic obtains data representative of a bandwidth parameter set from the request to send frame.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, a transmitter includes data representative of a bandwidth parameter set, and optionally, data indicating whether a packet contains data representative of a bandwidth parameter set.

Figure 3:
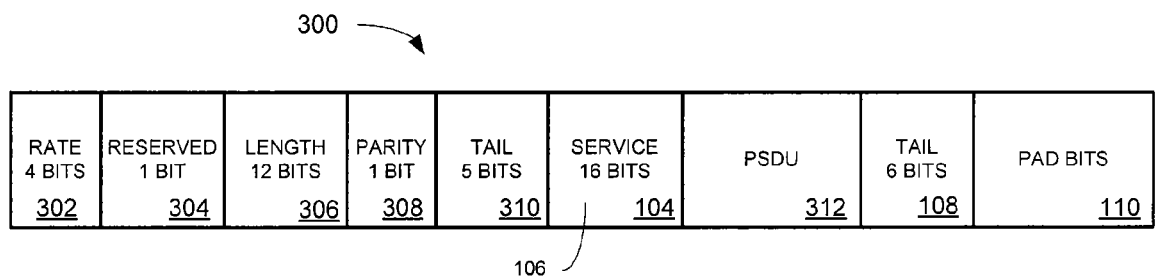
FIG. 3 is an example of a simplified packet format of an 802.11a frame upon which an example embodiment can be implemented.
Figures 2, 4:
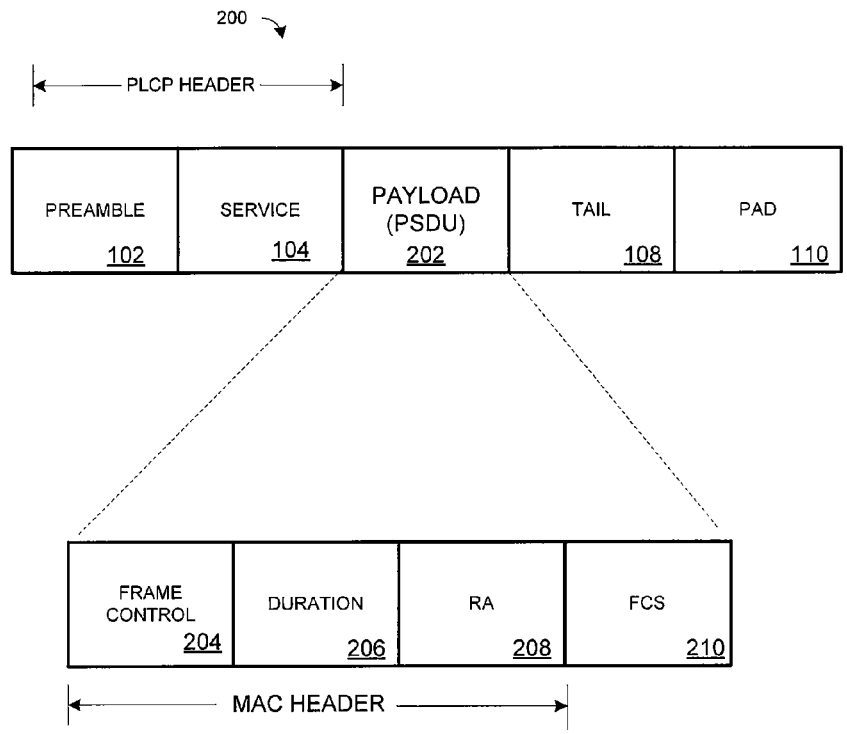
FIG. 2 is an example of a simplified packet format for a CTS frame upon which an example embodiment may be implemented.
FIG. 4 illustrates an example of pad bits of a frame modified to include bandwidth parameter set data in accordance with an example embodiment.

Referring to FIGS. 1-3 there are illustrated simplified frame formats 100, 200 upon which an example embodiment can be implemented. FIG. 1 illustrates a simplified frame 100 that comprises a physical-layer convergence protocol (PLCP) Header that comprises a preamble 102 and a service field 104. Within service field 104 is a scrambler seed 106, which is a 1:1 mapping to the first seven bits of the service field (herein called the scrambler field). The payload, or physical layer service data unit (PSDU), is represented by field 112. Frame 100 further comprises a tail 108 and pad 110.

In the example illustrated in FIG. 1, the payload 112 comprises a RTS frame. The RTS comprises a frame control field 114, duration field 116, receiver address (RA) 118, transmitter address (TA) 120, and frame check sum (FCS) 122.

FIG. 2 illustrates an example of a simplified frame format 200, where the payload, PSDU, 202 comprises a CTS frame. The CTS frame comprises a frame control field 204, duration field 206, RA 208, and FCS 210.

The example 802.11a frame 300 illustrated in FIG. 3 may be employed for a RTS frame as described in FIG. 1 and/or a CTS frame as described in FIG. 2. Frame 300 comprises fields 104, 106, 108, 110 described in FIGS. 1 and 2. In addition, the PLCP header of frame 200 comprises a rate field 302, a reserved bit 304, a Duration field 306, a parity bit 308, and tail bits 310 for the preamble, e.g., preamble 102, of the PLCP header. The payload, PSDU 312, may suitably be a RTS frame or a CTS frame configured as described in an example embodiment herein. The frame further comprises tail bits 108 and pad 110 bits. As one skilled in the art can appreciate from FIG. 3, an example embodiment described herein is compatible with legacy 802.11a RTS and/or CTS frames.

In an example embodiment, a transmitter partitions a scrambler seed or scrambler field 106 of a predetermined frame, such as a RTS frame, into a predetermined format. For example, four bits may be used for the scrambler seed 106 while the remaining three bits of scrambler seed 106 are used for bandwidth parameter set. In an example embodiment two of the bits are employed to indicate the bandwidth. In particular embodiments a third bit is employed to indicate whether the transmitter is capable of static or dynamic bandwidth.

In an example embodiment, the transmitter includes data in the frame to indicate that a bandwidth parameter set is included with the frame. For example, a multicast bit may be set in the transmitter address (TA) 120 of a RTS frame. A receiver that receives a RTS with the multicast bit set in TA 120 would insert the TA 120 into the receiver address of the CTS frame, but would change the multicast bit to unicast. For example, if a receiver received frame 100 and TA 120 had a multicast bit set, the receiver sends a CTS frame similar to frame 200 illustrated in FIG. 2. The RA 208 of the CTS frame would have TA contained in TA 120 of the RTS frame, however, the multicast bit would be changed to a unicast bit.

When a receiver receives the packet, the receiver can detect whether the frame contains a bandwidth parameter set. In an example embodiment, the receiver checks the status of the multicast/unicast address of the TA field 120. If the TA field 10 contains data indicating the packet contains bandwidth parameter set data, the receiver runs a scrambler in reverse to obtained the partitioned scrambler seed, and obtains the bandwidth indication, e.g., 20/40/80/160 MHz from the partitioned scrambler seed. In particular embodiments, the receiver also determines whether the indication is static or dynamic.

In an example embodiment, the location of the bandwidth parameter set data may be varied within the scrambler seed or scrambler field. The transmitter performs a hash of Duration field 206. The transmitter includes the data representative of a bandwidth parameter set at a location within the scrambler seed of the frame based on the hash of Duration field 206. Another option is a hash based on the Duration field in the MPDU In an example embodiment, the pad bits can be modified to include the data representative of a bandwidth parameter set. The pad bits may be modified in a RTS frame, e.g. frames 100 (FIG. 1) CTS frame 200 (FIG. 2) and/or in a frame such frame 300 illustrated in FIG. 3.

Table 1 below illustrates the properties of the pad field.

TABLE 1

| Non-HT (Mbps) | nPad (RTS @ 20 B) | nPad (CTS @ 14 B) | nPad Coded (RTS @ 20 B) | nPad Coded (CTS @ 14 B) |
| --- | --- | --- | --- | --- |
| 6 | 10 | 10 | 20 | 20 |
| 9 | 34 | 10 | 45 | 13.333 |
| 12 | 10 | 10 | 20 | 20 |
| 18 | 34 | 10 | 45 | 13.333 |
| 24 | 10 | 58 | 20 | 116 |
| 36 | 106 | 10 | 141.333 | 13.333 |
| 48 | 10 | 58 | 15 | 87 |
| 54 | 34 | 82 | 45.333 | 109.333 |

From Table 1, one skilled in the art can readily appreciate, there are at least ten coded pad bits available for a non-High Throughput (HT) RTS/CTS frame sent at 6, 9, 12, 18, 24, 36, 48 and 54 megabits per second (Mbps), and at least twenty coded pad bits available for 6, 12, 24, and 54 Mbps.

In an example embodiment, a second Viterbi Algorithm (VA) is run on a second 10-bit long trellis spanning the pad bits. In another example embodiment, a second Viterbi decoder is employed. In yet another example embodiment, a single VA is employed for RTS/CTS frames only and tail bits are decoded as data bits.

FIG. 4 is a table illustrating an example of how pad bits of a frame can be modified to include a bandwidth parameter set in accordance with an example embodiment. The modification to the pad bits illustrated in FIG. 4 may be performed on pad bits 110 in FIGS. 1-3. The tail column in FIG. 4 corresponds to tail bits 108 in FIGS. 1-3 and the columns under Pad in FIG. 4 correspond to pad bits 110 in FIGS. 1-3. The upper row of FIG. 4 illustrates a raw encoder input whereas the bottom row illustrates the actual encoder input in accordance with an example embodiment.

In an example embodiment, bit b0 is used to distinguish a legacy RTS/CTS from a RTS/CTS sent by a very high throughput "VHT" (e.g. an 802.11n compatible) device. Bits b1-b2 are employed to encode the bandwidth indication (for example 20/40/80/160 MHz) and bit b3 is employed to encode a static/dynamic bandwidth indication.

In an example embodiment, after the tail 108 and pad 110 bits, and in particular embodiments service field 104 and PSDU 312, have been scrambled, the pad bits are modified by overwriting or XORing or a mixture of both to include the bandwidth indication and/or static/dynamic indication. The modified pad bits are then input into an encoder.

In an example embodiment, ten pad bits, (e.g., from pad bits 110), are encoded then decoded in reverse (time reverse) using reversed BCC polynomial coefficients which enables the six tail zero bits used to terminate the first trellis to be reused to terminate the second trellis decoded in reverse. Thus, the tail can be employed to provide ten full data bits which will be correctly terminated with six zero tail bits. The 10 bits can be used for distinguishing from a legacy RTS/CTS, bandwidth indication, and/or static/dynamic indication. The 10 bits may further include one or more reserved bits and may also include a CRC to protect the data encoded in the ten pad bits.

In an example embodiment, bandwidth parameter set data may be stored in the encoded pad bits. In an example embodiment, four bits are employed: for the bandwidth parameter set one bit for legacy RTS/CTS indication, two for bandwidth indication, and one for a static/dynamic indication. In an example embodiment, pad bits 110 are modified by the four bits, and in particular embodiments, pad bits 110 are exclusive or'd (XOR) with the four bits. In another example embodiment, the five bits are employed for the bandwidth parameter set (1 bit for legacy RTS/CTS, two bits for bandwidth, one bit for static dynamic indication, and one reserved bit) may be stored multiple times in pad bits 110 (for example four copies may be stored which would result in 20 bits of pad bits 110 being used): i.e. a repetition code.

In an example embodiment, a receiver determines a bandwidth parameter set from a request to send frame. For example, in an example embodiment, the data representative of the bandwidth parameter set may be stored within the scrambler seed or scrambler field 106 of the frame. A reverse scramble is performed on the scrambler seed 106 to obtain the original scrambler seed, and the bandwidth parameter set. In particular embodiments, scrambler seed 106 of the frame further comprises data indicating whether the transmitter is capable of static or dynamic bandwidth. In an example embodiment, the receiver determines whether the request to send frame contains a bandwidth parameter set from the transmitter address 120. If a multicast bit is set in TA 120, the receiver obtains the bandwidth parameter set from the scrambler seed.

In an example embodiment, when the receiver responds to a request to send frame with a multicast bit set in TA 120 with a clear to send frame. The receiver copies the transmitter address field from the request to send frame into the receiver address of the clear to send frame. However, the unicast/multicast bit of the receiver bit is set to unicast.

In an example embodiment, the request to send frame further comprises a Duration field. The receiver performs a hash on the Duration field 306, such as Duration mod 7 and determines the location of the data representative of a bandwidth parameter set based on the hash of the Duration field.

In an example embodiment, the request to send frame further includes pad bits. The receiver obtains the data representative of a bandwidth parameter set from the pad bits 110.

For example, in an example embodiment, the processing logic decodes the Pad bits 110 as follows. A Viterbi algorithm is run in reverse starting from the end of the packet, using bit-reversed convolutional polynomial coefficients, so that the bits are decoded ending at the all-zeros Tail. The Viterbi algorithm can then be flushed with zeros. After decoding and bit reversing the decoded bits (to compensate for the time-reversed Viterbi decoding), the bandwidth parameter set is extracted from the bit reversed time-reverse-decoded Pad and Tail bits from a predetermined location within the decoded Pad bits 110.

In an example embodiment, the data representative of a bandwidth parameter set is retrieved by the receiver from a sequence of at least four bits in the pad bits 110 of the request to send frame. In particular embodiments, the four bits a repeated a predetermined number of times. In an example embodiment, the at least four bits includes a legacy RTS/CTS bit, two bits for bandwidth indication, one bit for static/dynamic indication, and one reserved bit for a total of five bits. These five bits are repeated four times, which results in the bandwidth parameter set using twenty of the pad bits. The receiver may determine the bandwidth parameter set from the decoded pad bits 110, or in particular embodiments, the receiver may perform an XOR to obtain the bandwidth parameter set.

An aspect of the example embodiment described herein is that a receiver can determine from a RTS frame whether transmitter has requested a bandwidth indication, e.g., 20/40/80/160 MHz and whether the transmitter is capable of static or dynamic bandwidth, from a single received frame. For example, the receiver may receive a RTS on its primary channel and can determine that the RTS is requesting multiple channels even if the receiver does not receive a RTS on any of the secondary channels.

Figure 5:
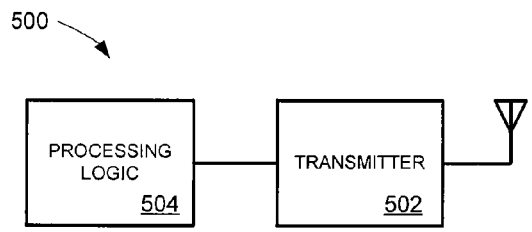
FIG. 5 illustrates an example of a transmitter for transmitting a request to send frame with a bandwidth parameter set.

FIG. 5 illustrates an example of an apparatus for transmitting a request to send frame with a bandwidth parameter set. Apparatus 500 comprises a transmitter 502 for transmitting a predefined frame such as a RTS with a bandwidth parameter set. Processing logic 504 is coupled with transmitter 502 and sends data via transmitter 502. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described functionality when executed by a processor. Logic may suitably comprise one or more modules configured to perform one or more functions.

In an example embodiment, processing logic 504 partitions a scrambler seed, e.g., scrambler seed 106 (FIG. 1 or FIG. 3), of a predetermined frame, such as a RTS frame, into a predetermined format. For example, four bits may be used for the scrambler seed 106 (FIG. 1 or FIG. 3) while the remaining three bits of scrambler seed 106 (FIG. 1 or FIG. 3) are used for bandwidth and static/dynamic indication. In an example embodiment two of the bits are employed to indicate the bandwidth. In particular embodiments a third bit is employed to indicate whether the transmitter is capable of static or dynamic bandwidth.

In an example embodiment, processing logic 504 includes data in the frame to indicate that a bandwidth and static/dynamic indication is included with the frame. For example, a multicast bit may be set in the transmitter address (TA) 120 (FIG. 1 or FIG. 3) of a RTS frame.

In an example embodiment, the location of the bandwidth parameter set data may be varied within the scrambler seed. For example, processing logic 504 may perform a hash of the Duration field 206 (FIG. 3). Processing logic 504 would include the data representative of a bandwidth parameter set at a location within the scrambler seed of the frame based on the hash of the Duration field 206 (FIG. 3).

In an example embodiment, processing logic 504 modifies the pad bits to include the data representative of a bandwidth parameter set. The pad bits may be modified in a RTS frame, e.g. frames 100 (FIG. 1) and/or frame 300 illustrated in FIG. 3.

In an example embodiment, processing logic 504 runs a second Viterbi Algorithm (VA) on a second 10-bit long trellis spanning the pad bits (e.g., pad 110 in FIG. 1 or FIG. 3). In another example embodiment, a second Viterbi decoder is employed. In yet another example embodiment, a single VA is employed for RTS/CTS frames only and tail bits are decoded as data bits.

In an example embodiment, processing logic 504 sets tail bit b0 (see FIG. 4) is used to distinguish a legacy RTS/CTS from a RTS/CTS sent by a very high throughput "VHT" (e.g. an 802.11n compatible) device. Bits b1-b2 (FIG. 4) are employed to encode the bandwidth indication (for example 20/40/80/160 MHz) and bit b3 is employed to encode a static/dynamic bandwidth indication.

In an example embodiment, after the tail 108 and pad 110 bits, and in particular embodiments service field 104 and PSDU 312, have been scrambled, processing logic 504 overwrites the pad bits with zeros and the pad bits are modified to include the bandwidth indication and/or static/dynamic indication. The modified pad bits are then input into an encoder.

In an example embodiment, processing logic 504 encodes ten pad bits, (e.g., from pad bits 110), so they can be decoded in reverse (time reverse) which enables the six tail zero bits used to terminate the first trellis to be reused to terminate a second trellis operating in reverse. Thus, the tail can be employed to provide ten full data bits which will be correctly terminated with six zero tail bits. The 10 bits can be used for distinguishing from a legacy RTS/CTS, bandwidth indication, and/or static/dynamic indication. The 10 bits may further include one or more reserved bits and may also include a CRC to protect the data encoded in the ten pad bits.

In an example embodiment, processing logic 504 stores bandwidth parameter set data in the encoded pad bits. In an example embodiment, four bits are employed for the bandwidth parameter set: one bit for legacy RTS/CTS indication, two for bandwidth indication, and one for a static/dynamic indication. In an example embodiment, pad bits 110 are modified by the four bits, and in particular embodiments, pad bits 110 are exclusive or'd (XOR) with the four bits. In an example embodiment, the four bits may be stored multiple times in pad bits 110 (for example five copies may be stored which would result in 20 bits of pad bits 110 being used).

Figure 6:
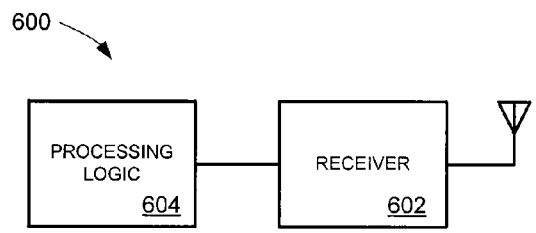
FIG. 6 illustrates an example of a receiver that obtains a bandwidth parameter set from a request to send frame.

FIG. 6 illustrates an example of an apparatus 600 that obtains a bandwidth parameter set from a request to send frame. Apparatus 600 comprises a receiver 602 and processing logic 604 coupled with receiver 602. Processing logic 604 receives frames via receiver 602.

In an example embodiment, processing logic 604 determines a bandwidth parameter set from a request to send frame received via receiver 602. For example, in an example embodiment, the data representative of the bandwidth parameter set may be stored within the scrambler seed 106 (FIG. 1 or FIG. 3) of the frame. Processing logic 604 performs a reverse scramble on the scrambler seed 106 (FIG. 1 or FIG. 3) to obtain the original scrambler seed, and the bandwidth parameter set. In particular embodiments, scrambler seed 106 (FIG. 1 or FIG. 3) of the frame further comprises data indicating whether the transmitter is capable of static or dynamic bandwidth. In an example embodiment, processing logic 604 determines whether the request to send frame contains a bandwidth parameter set from the transmitter address 120 (FIG. 1). If a multicast bit is set in TA 120 (FIG. 1), processing logic 604 obtains the bandwidth parameter set from the scrambler seed 106 (FIG. 1 or FIG. 3).

In an example embodiment, the request to send frame further comprises a Duration field 306 (FIG. 3). Processing logic 604 performs a hash on the Duration field 306 (FIG. 3) and determines the location of the data representative of a bandwidth parameter set based on the hash of the Duration field.

In an example embodiment, the request to send frame further includes pad bits 110 (FIG. 1 or FIG. 3). Processing logic 604 obtains the data representative of a bandwidth parameter set from the pad bits 110 (FIG. 1 or FIG. 3).

For example, in an example embodiment, processing logic 604 decodes the tail bits 110. Processing logic 604 obtains the bandwidth parameter set from a predetermined location within the decoded tail bits. In particular embodiments, however, the processing logic 604 obtains the data representative of the bandwidth parameter set from the pad bits 110 (FIG. 1), as follows. A Viterbi algorithm is run in reverse starting from the end of the packet, using bit-reversed convolutional polynomial coefficients, so that the bits are decoded ending at the all-zeros Tail. The Viterbi algorithm can then be flushed with zeros. After decoding and bit reversing the decoded bits (to compensate for the time-reversed Viterbi decoding), the bandwidth parameter set is extracted from the bit reversed time-reverse-decoded Pad and Tail bits.

In an example embodiment, the data representative of a bandwidth parameter set is obtained by processing logic 604 from a sequence of at least four bits in the pad bits 110 (FIG. 1 or FIG. 3) of the request to send frame. In particular embodiments, data representative of a bandwidth parameter set is five bits which are repeated a predetermined number of times, for example four times, which results in the bandwidth parameter set using twenty bits. The receiver may determine the bandwidth parameter set from the decoded pad bits 110 (FIG. 1 or FIG. 3), or in particular embodiments, the receiver may perform an XOR to obtain the bandwidth parameter set.

FIG. 7 illustrates an example of an apparatus 700 capable of receiving a request to send (RTS) frame with a bandwidth parameter set and to respond by sending a clear to send (CTS) frame. Apparatus 700 comprises a receiver 702 that receives the frame and processing logic 704 coupled with receiver 702. Processing logic 704 receives a RTS frame data via receiver 702. Apparatus 700 further comprises a transmitter 706 coupled with processing logic 704 that processing logic 704 employs for sending frames, such as a CTS in response to receiving a RTS via receiver 702.

In an example embodiment, processing logic 704 determines a bandwidth parameter set from a request to send frame received via receiver 702. For example, in an example embodiment, the data representative of the bandwidth parameter set may be stored within the scrambler seed 106 (FIG. 1 or FIG. 3) of the frame. Processing logic 704 performs a reverse scramble on the scrambler seed 106 (FIG. 1 or FIG. 3) to obtain the original scrambler seed, and the bandwidth parameter set. In particular embodiments, scrambler seed 106 (FIG. 1 or FIG. 3) of the frame further comprises data indicating whether the transmitter is capable of static or dynamic bandwidth. In an example embodiment, processing logic 704 determines whether the request to send frame contains a bandwidth parameter set from TA 120 (FIG. 1). If a multicast bit is set in TA 120, processing logic 704 obtains the bandwidth parameter set from the scrambler seed 106 (FIG. 1 or FIG. 3).

In an example embodiment, processing logic 704 responds to a request to send frame with a multicast bit set in TA 120 with a clear to send frame (see e.g., frame 200 in FIG. 2). Processing logic 704 copies TA 120 from the request to send frame into RA 208 of the clear to send frame (frame 200 in FIG. 2). However, the unicast/multicast bit of the receiver bit is set to unicast.

In an example embodiment, the request to send frame further comprises a Duration field. Processing logic 704 performs a hash on the Duration field 306 (FIG. 3) and determines the location of the data representative of a bandwidth parameter set based on the hash of the Duration field.

In an example embodiment, the request to send frame further includes pad bits 110 (FIG. 1 or FIG. 3). The receiver obtains the data representative of a bandwidth parameter set from the pad bits 110 (FIG. 1 or FIG. 3).

For example, in an example embodiment, processing logic 704 decodes the pad bits 110. The bandwidth parameter set is obtained from a predetermined location within the decoded pad bits. In particular embodiments, however, the processing logic obtains the data representative of the bandwidth parameter set from the pad bits as follows. 110 A Viterbi algorithm is run in reverse starting from the end of the packet, using bit-reversed convolutional polynomial coefficients, so that the bits are decoded ending at the all-zeros Tail. The Viterbi algorithm can then be flushed with zeros. After decoding and bit reversing the decoded bits (to compensate for the time-reversed Viterbi decoding), the bandwidth parameter set is extracted from the bit reversed time-reverse-decoded Pad and Tail bits.

In an example embodiment, the data representative of a bandwidth parameter set is retrieved by the receiver from a sequence of at least four bits in the pad bits 110 of the request to send frame. In particular embodiments, the four bits a repeated a predetermined number of times, for example four times, which results in the bandwidth parameter set using twenty bits. The receiver may determine the bandwidth parameter set from the decoded pad bits 110, or in particular embodiments, the receiver may perform an XOR to obtain the bandwidth parameter set.

In an example embodiment, where processing logic 704 determines a bandwidth parameter set from pad bits 110 (FIG. 1) of a RTS frame, processing logic 704 includes the bandwidth parameter set in a CTS frame sent in response to the RTS frame. The bandwidth parameter set may be encoded the same way as received, for example a repeated series of bits, inserting the bandwidth parameter set into scrambled pad bits, and/or modifying encoded tail bits to include the bandwidth parameter set as described herein. The CTS frame is sent via transmitter 706.

Figure 8:
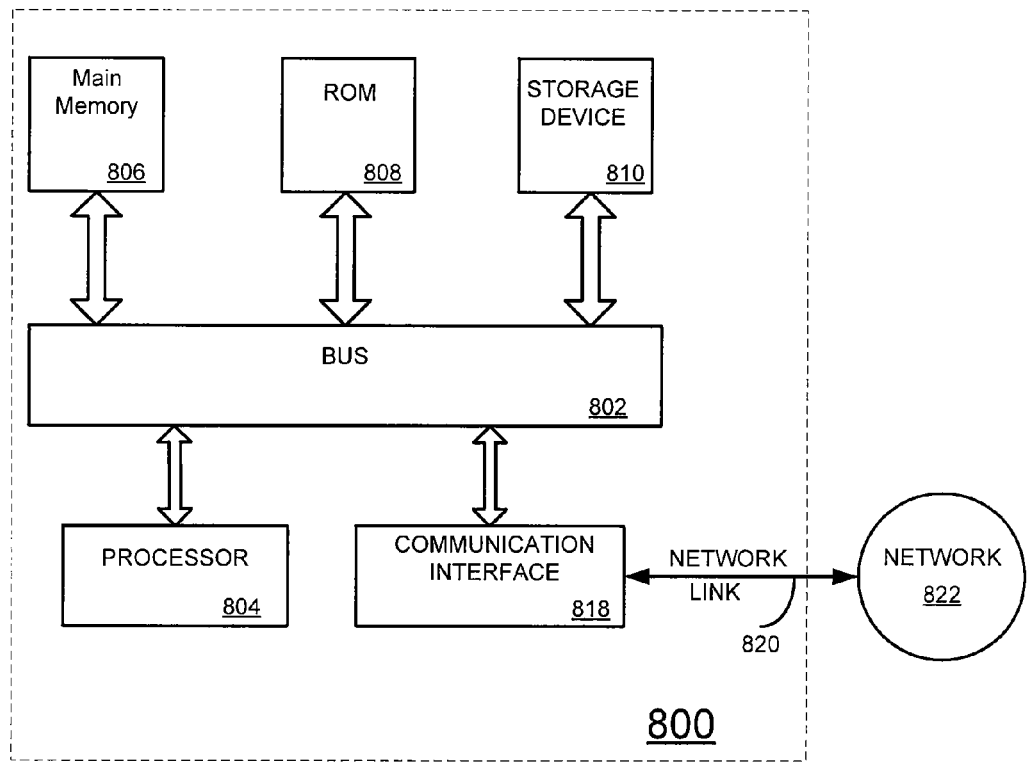
FIG. 8 illustrates a computer system upon which an example embodiment can be implemented.

FIG. 8 illustrates a computer system 800 upon which an example embodiment can be implemented. Computer system 800 is suitable for implementing the functionality of processing logic 504 (FIG. 5), processing logic 604 (FIG. 6), and/or processing logic 704 (FIG. 7). In addition, computer system 800 may be employed to implement the methodologies described herein infra.

Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

An aspect of the example embodiment is related to the use of computer system 800 for providing a bandwidth parameter set in a RTS and/or CTS frame. According to an example embodiment, providing a bandwidth parameter set in a RTS and/or CTS frame is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 804 for execution. Such a medium may take many forms, including but not limited to non-volatile media, and volatile media. Non-volatile media include for example optical or magnetic disks, such as storage device 810. Volatile media include dynamic memory such as main memory 806. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 804 for execution. For example, the instructions may initially be borne on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806 from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling computer system 800 to a network link 820 that is connected to a local network 822. Network 822 may be a wired network, a wireless network, and/or a combination of wired and wireless networks.

Computer system 800 may send and/or receive RTS frames form network 822 via communication interface 818. In particular embodiments, computer system 800 may send CTS frames in response to an RTS frame via communication interface 818.

In an example embodiment, computer system 800 can send messages and receive data, including program codes, through network(s) via network link 820, and communication interface 818. Computer system 800 may download applications from network 822 via network link 820 and communication link 818. In accordance with an example embodiment, one such downloaded application provides for providing a bandwidth parameter set in RTS and/or CTS frames as described herein.

In view of the foregoing structural and functional features described above, methodologies in accordance with example embodiments will be better appreciated with reference to FIG. 9-12. While, for purposes of simplicity of explanation, the methodologies of FIG. 9-12 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies described herein in accordance with an aspect of an example embodiment. The methodologies described herein are suitably adapted to be implemented in hardware, software, or a combination thereof. For example, the methodologies may be implemented by processor 804 in FIG. 8 executing the appropriate instructions.

FIG. 9 illustrates an example of a methodology 900 where a receiver determines whether a scrambler seed in a request to send frame contains a bandwidth parameter set. Methodology 900 may be implemented by processing logic 604 (FIG. 6), processing logic 704 (FIG. 7) and/or processor 804 (FIG. 8).

At 902, the receiver examines the transmitter address (TA) of a RTS frame. At 904, the receiver determines whether a multicast/unicast bit in the TA of the RTS frame is set to multicast.

If the multicast/unicast bit of the TA of the RTS frame is not set to multicast (NO), then the RTS frame is processed without a bandwidth parameter set at 906. If, however, at 904, a determination was made that the multicast/unicast bit in the TA of the RTS frame was set (YES), at 908, the receiver obtains a bandwidth parameter set from a predefined location within the frame. In an example embodiment, the bandwidth parameter set is obtained from the scrambler seed. A reverse scramble may be performed on the scrambler seed to obtain the bandwidth parameter set.

In particular embodiments, the location of the bandwidth parameter set in the scrambler seed may vary. In an example embodiment, a hash of the Duration field, or any other suitable field, is obtained and the hash is used to identify the location of the bandwidth parameter set within the scrambler seed.

FIG. 10 illustrates an example of a methodology 1000 where a receiver determines whether a scrambler seed in a request to send (RTS) frame contains a bandwidth parameter set and sends a .clear to send (CTS) frame in response. Methodology 900 may be implemented by processing logic 704 (FIG. 7) and/or processor 804 (FIG. 8).

At 1002, the receiver examines the transmitter address (TA) of a RTS frame. At 1004, the receiver determines whether a multicast/unicast bit in the TA of the RTS frame is set to multicast.

If the multicast/unicast bit of the TA of the RTS frame is not set to multicast (NO), then the RTS frame is processed without a bandwidth parameter set at 1006. If, however, at 1004, a determination was made that the multicast/unicast bit in the TA of the RTS frame was set (YES), at 1008, the receiver obtains a bandwidth parameter set from a predefined location within the frame. In an example embodiment, the bandwidth parameter set is obtained from the scrambler seed. A reverse scramble may be performed on the scrambler seed to obtain the bandwidth parameter set.

In particular embodiments, the location of the bandwidth parameter set in the scrambler seed may vary. In an example embodiment, a hash of the Duration field, or any other suitable field, is obtained and the hash is used to identify the location of the bandwidth parameter set within the scrambler seed.

At 1010, a CTS frame is generated in response to the RTS frame. At 1012, the TA of the RTS frame is copied into the RA of the CTS frame. At 1014, the multicast/unicast bit in the RA of the CTS frame is set to unicast. At 1016, the CTS is transmitted.

The properties of the pad field of RTS/CTS frames is illustrated in Table 1 supra. As one skilled in the art can readily appreciate, there are at least ten coded pad bits available for a non-High Throughput (HT) RTS/CTS frame sent at 6, 9, 12, 18, 24, 36, 48 and 54 megabits per second (Mbps), and at least twenty coded pad bits available for 6, 12, 24, and 54 Mbps. The methodology described in FIG. 11 infra employs 10 pad bits so it can be used in any of the aforementioned RTS/CTS frames. The methodology described in FIG. 12 employs 20 pad bits, so it can be employed for RTS/CTS frames sent at 6, 12, 24, and 54 Mpbs.

Figure 11:
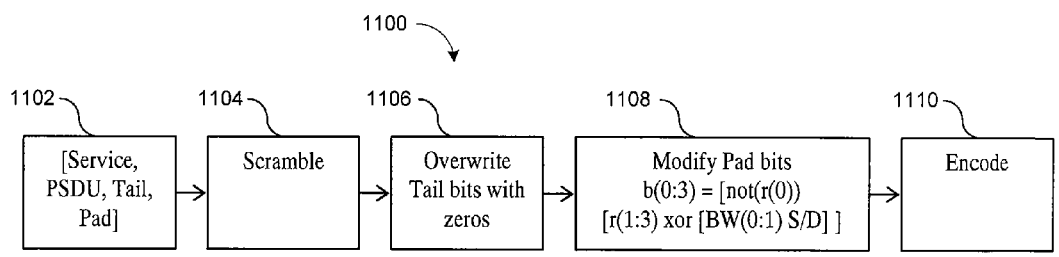
FIG. 11 illustrates an example of a methodology for encoding a bandwidth parameter set into a pad field of a RTS/CTS frame.

FIG. 11 illustrates an example of a methodology 1100 for encoding a bandwidth parameter set into a pad field of a RTS/CTS frame. Methodology 1100 may be performed by processing logic 504 (FIG. 5), processing logic 704 (FIG. 7), and/or processor 804 (FIG. 8).

At 1102, a frame is generated with a service field, payload (PSDU), tail bits and pad bits. The frame may be a RTS or a CTS frame. For example, if a RTS frame has a bandwidth parameter set stored in the pad bits, the CTS frame may also be sent with a bandwidth parameter set in the pad bits.

At 1104, the Service field, PSDU, Tail bits and pad bits are scrambled. At 1106, the scrambled tail bits are overwritten with a predefined value, such as zeros. At 1108 bandwidth parameter set data is then inserted into the pad bits. In an example embodiment, the first pad bit (B0) is the inverse of the raw encoder input (R0), or B0=not R0. The bandwidth indication is exclusive or'd (XOR) with the pad. In particular embodiments, a static/dynamic indication is also included. For example, raw encoder bits R1 and R2 can be XOR'd with the bandwidth indication and encoder bit R3 XOR'd with the static/dynamic indication.

At 1110, the modified pad bits are encoded. A receiver receiving a frame having the bandwidth parameter set stored in this matter can obtain the bandwidth parameter set after decoding the pad bits. In an example embodiment, ten pad bits are employed for the bandwidth parameter set, where four bits are assigned as first bit=legacy frame (yes/no), second and third bits=bandwidth indication (e.g., 20/40/80/160 MHz) bit, fourth bit=static/dynamic indication and the remaining six bits are the same as the raw encoder input. In a particular embodiment, the pad bits are encoded normally but are decoded in reverse (reverse time) using bit-reversed convolutional polynomials so that the six tail zero bits terminate the first trellis and can be reused to terminate a second trellis operating in reverse. This would allow ten data bits in the tail to be employed for bandwidth parameter set and/or other data which are correctly terminated with six zero tail bits.

Figure 12:
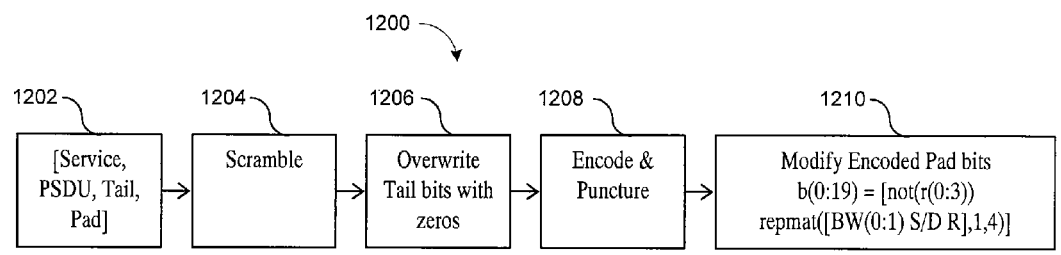
FIG. 12 illustrates an example of a methodology for storing a bandwidth parameter set into a pad field of a RTS/CTS frame after the pad field has been encoded and punctured.

FIG. 12 illustrates an example of a methodology 1200 for storing a bandwidth parameter set into a pad field of a RTS/CTS frame after the pad field has been encoded and punctured. Methodology 1200 may be performed by processing logic 504 (FIG. 5), processing logic 704 (FIG. 7), and/or processor 804 (FIG. 8).

At 1202, a service field, payload (PSDU), tail bits and pad bits are generated for the RTS/CTS packet. At 1204, the service field, payload, tail bits and pad bits are scrambled. At 1206 the tail bits of the scrambled data is overwritten with a predefined value, zeros in this example, however any suitable value can be employed. At 1208, the scrambled data with the overwritten tail bits are encoded and punctured.

At 1210 the encoded bits are modified. In the illustrated example five bits are used for the bandwidth parameter set. The first bit for legacy RTS/CTS indicator, two bits for the bandwidth indication (e.g., 20/40/80/160 MHz), one bit for a static/dynamic indication and a reserved bit. In particular embodiments, the five bits are repeated four times so that the data representative of a bandwidth parameter set uses twenty bits. The encoded pad bits may be overwritten or XOR'd with the data representative of the bandwidth parameter set.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising
   a transmitter;
   processing logic coupled with the transmitter, the processing logic is configured to send data via the transmitter;
   wherein the processing logic generates a request to send frame, the request to send frame comprising pad bits;
   wherein the processing logic encodes data representative of a bandwidth parameter set into the pad bits of the request to send frame;
   wherein the processing logic transmits the request to send frame via the transmitter;
   wherein the request to send frame further includes service bits, a payload, and tail bits;
   wherein the processing logic scrambles the service bits, payload, tail bits, and bits;
   wherein the processing logic overwrites the tail bits with a predefined value;
   wherein the processing logic modifies a portion of the pad bits to include the data representative of a bandwidth parameter set;
   wherein the processing logic encodes the service bits, payload, tail bits, and pad bits after modifying the pad bits to include the data representative of a bandwidth parameter set; and
   wherein the pad bits further include a cyclic redundancy code that protects the data representative of a bandwidth parameter set in the data to distinguish from a legacy request to send and/or to ensure that bit errors do not lead to an erroneous understanding of the bandwidth indication or static/dynamic indication.

2. The apparatus of claim 1, wherein processing logic further encodes data representative of whether the transmitter is capable of static or dynamic bandwidth into the data representative of the bandwidth parameter in the scrambled service bits and payload.

3. The apparatus of claim 1, wherein the request to send frame further comprises a transmitter address field; and
   wherein the processing logic sets a multicast bit in the transmitter address field to indicate that the frame contains a bandwidth parameter set in the scrambled service bits and payload.

4. The apparatus of claim 1, wherein the request to send frame further comprises a Duration field;
   wherein the processing logic performs a hash on the Duration field; and
   wherein the processing logic includes the data representative of a bandwidth parameter set at a location in the scrambler seed field of the frame based on the hash of the Duration field.

5. The apparatus of claim 1, wherein the processing logic encodes ten pad bits so that they can be decoded in reverse time using bit-reversed convolutional code polynomials.

6. The apparatus of claim 1, wherein the processing logic modifies pad bits to include the bandwidth parameter set after the pad bits are encoded and punctured.

7. The apparatus of claim 1, wherein the processing logic modifies at least five bits of the pad bits of the request to send frame to include the bandwidth parameter set.

8. The apparatus of claim 7, wherein the processing logic includes multiple additional copies of the at least five bits of the modified pad bits.

9. An apparatus, comprising
   a receiver;
   processing logic coupled with the transmitter, the processing logic is configured to receive data via the receiver;
   wherein the processing logic receives a request to send frame, the request to send frame comprising pad bits;
   wherein the request to send frame further includes service bits, a payload, and tail bits;
   wherein the processing logic decodes the service bits, payload, tail bits, and the pad bits;
   wherein the processing logic obtains data representative of a bandwidth parameter set from the decoded pad bits;
   wherein a portion of the pad bits includes the data representative of a bandwidth parameter set;
   wherein the processing logic descrambles the service bits, playload, tail bits, and bits;
   wherein the pad bits include a cyclic redundancy code that protects the data representative of a bandwidth parameter set in the data to distinguish from a legacy request to send and/or to ensure that bit errors do not lead to an erroneous understanding of the bandwidth indication or static/dynamic indication.

10. The apparatus of claim 9, wherein the processing logic obtains the data representative of the bandwidth parameter set from the pad bits before decoding the pad bits.

11. The apparatus of claim 9, wherein the processing logic obtains the data representative of a bandwidth parameter set from a sequence of at least four bits in the pad bits of the request to send frame.

12. The apparatus of claim 9, further comprising a transmitter;
   wherein the processing logic is responsive to receiving the request to send frame to respond with a clear to send frame, the clear to send frame comprising tail bits;
   wherein the processing logic encodes data representative of the bandwidth parameter set in pad bits of the clear to send frame;
   wherein the clear to send frame with the encoded data representative of the bandwidth parameter set in the pad bits is sent via the transmitter.

* * * * *